Jan. 14, 1930.                L. E. JOHNSON                1,743,354
                              INDICATING DEVICE
                              Filed Aug. 17, 1927
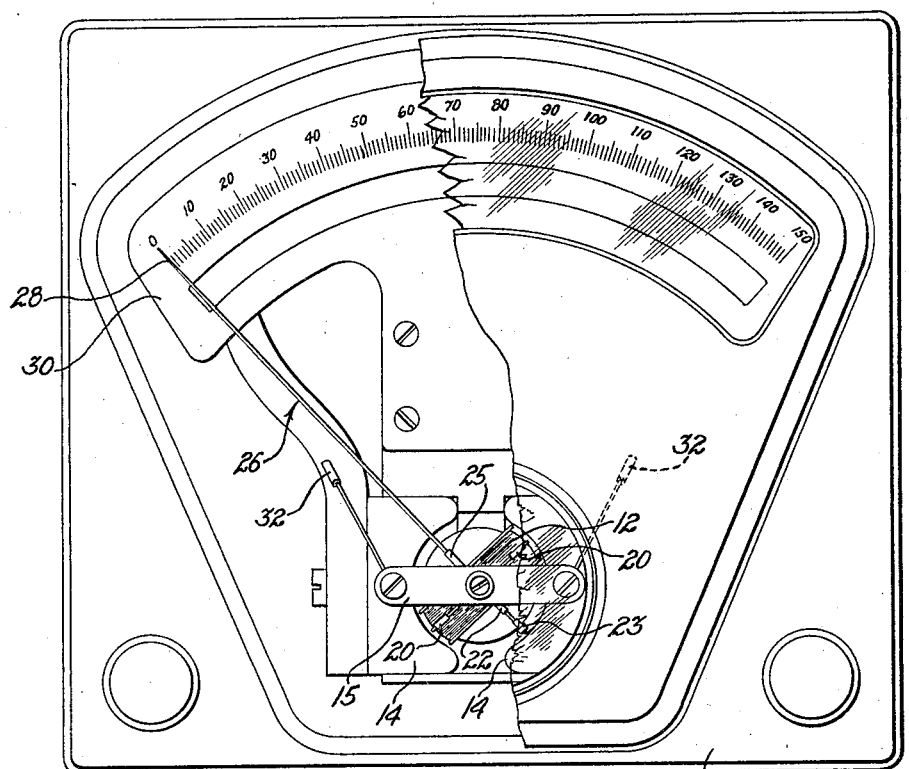
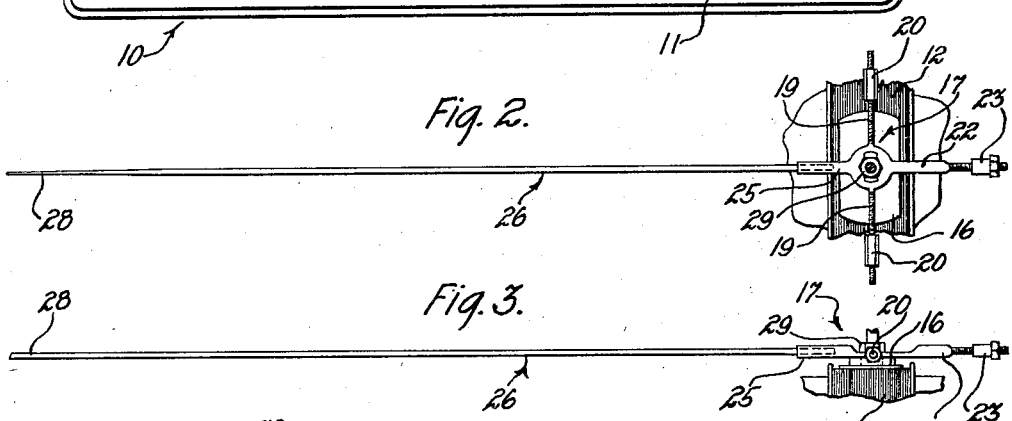
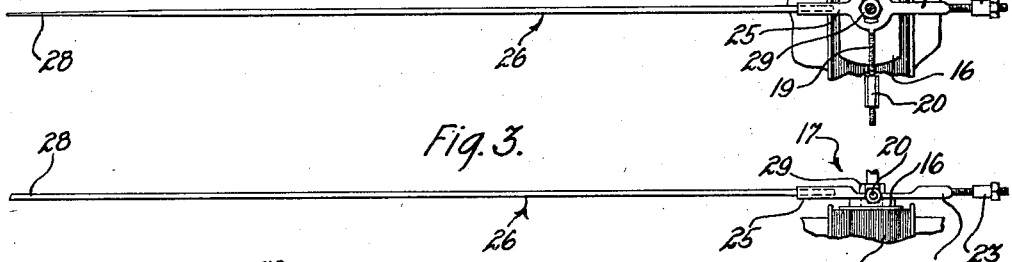
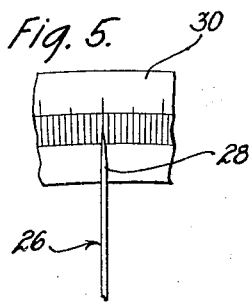
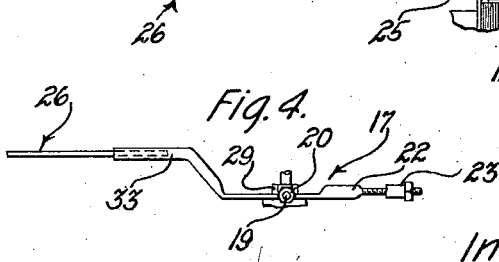
Inventor
Louis E. Johnson Patented Jan. 14, 1930

1,743,354

UNITED STATES PATENT OFFICE

LOUIS EDWARD JOHNSON, OF CHICAGO, ILLINOIS, ASSIGNOR TO WESTERN ELECTRIC COMPANY, INCORPORATED, OF NEW YORK, N. Y., A CORPORATION OF NEW YORK

INDICATING DEVICE

Application filed August 17, 1927. Serial No. 213,589.

This invention relates to indicating devices, and more particularly to indicating needles or pointers attached to moving elements of meters.

Measuring instruments, such as volt meters, ammeters, and the like, are in some instances subjected to abnormal operating conditions and under such conditions the meter needle or pointer may be abruptly moved or suddenly stopped which may be severe enough to cause a permanent deformation, bending or breakage of the needle or pointer. A permanent deformation of a pointer renders the meter unfit for accurate testing purposes until the pointer is repaired or replaced and obviously the continuous replacement and repairing of defective parts greatly increases the cost of meter maintenance.

The primary object of this invention is to provide a simple and durable indicating device which will effectively obviate the difficulties heretofore encountered.

In accordance with the general features of the invention, one embodiment thereof comprises an indicator or pointer mounting or support which is secured in position upon the moving coil or armature of an electrical measuring instrument. A shank of the mounting is apertured to receive one extremity of a slender pointer which may be constructed of straight grained, long fibred material, such as bamboo. The free extremity of the pointer is gradually tapered and adapted for association with the instrument scale. The pointer or indicator material is of such a quality that it may be subjected to extreme shocks during its oscillatory movements without experiencing the slightest degree of permanent deformation.

These and other objects will be more apparent from the following detailed description when considered in connection with the accompanying drawings, wherein Fig. 1 is a plan view of a conventional meter equipped with an indicator, designed in accordance with the invention, a portion of the instrument casing being broken away to disclose parts otherwise hidden;

Fig. 2 is an enlarged plan view of the indicating device shown in association with a fragmentary portion of a moving coil;

Fig. 3 is a side elevational view of the indicating device shown in Fig. 2;

Fig. 4 is a fragmentary side elevational view of a modified form of indicating device, which is provided with a bend in the supporting shank thereof, and Fig. 5 is a fragmentary detailed view of a pointer shown in association with the meter scale, said pointer being gradually tapered in a manner differing from the taper disclosed in Figs. 2 and 3 in order to lend visible width to the pointer tip.

Referring now to the drawing wherein like numerals have been employed to designate similar parts throughout the various figures, it will be observed that a measuring instrument or volt meter designated generally by the numeral 10 is disclosed in Fig. 1. This volt meter 10 is of conventional design having a base or casing 11 which houses an armature or moving coil 12 pivoted intermediate a pair of conventional pole pieces 14 and beneath a suitable frame bar 15. A pivoted plate 16 resting upon the outer portion of the moving coil 12 serves as a mounting for a pointer support member indicated generally by the numeral 17 which is formed in the shape of a cross. Opposed threaded arms 19 of the support 17 are provided with weights 20 threaded thereon, which serve as balancing means when the support 17 is operatively associated with the moving coil 12. Another arm 22 of the support 17 at right angles to the threaded arms 19 is provided with a threaded balancing weight 23 and oppositely disposed from the arm 22 is a shank 25 provided with an aperture to receive one extremity of a slender indicator or pointer 26. The pointer 26 is snugly fitted within the aperture of the shank 25 and a drop of adhesive material may be applied, if necessary, at the junction of the pointer and the shank in order to further secure the pointer in a fixed position.

This pointer 26 is gradually tapered at its free extremity to present a tip 28 and when the pointer support 17 is properly secured upon the plate 16 by means of a suitable lock nut 29, the tip 28 will lie immediately adjacent the graduations of a scale plate 30 of the meter 10. The pointer 26 is constructed of material which is adapted to effectively withstand severe shocks, such as bending and jerking, which necessarily result when the pointer is suddenly swung from one extremity of the scale plate 30 to the other. The pointer must be sufficiently resilient to absorb the shocks to which it is subjected upon being swung to one extreme position and carried into engagement with one of a pair of stops 32 conveniently supported by the frame member 15 (Fig. 1). Aside from the above mentioned resilient characteristics of the pointer 26 which permit of the immediate return to its normal straight position after experiencing a severe shock or bend, the pointer must be capable of withstanding variations in atmospheric conditions and at the same time be of very small mass. Experience has shown that materials, such as bamboo, reed or other similar woody and fibrous plant material which are straight grained and formed with relatively long fibres may be used with effectiveness in the construction of the described pointers. The arrangement of the fibres in such materials peculiarly adapts them for pointer construction. A strip of bamboo, for example, may be drawn through a die of circular cross section and thereby very readily and quickly formed into a slender, resilient, yet firm wire-like member having all the characteristics necessary to enable an indicator or pointer to withstand the extreme shocks incident to the use of electrical measuring apparatus and the like. By using straight grained material having relatively long fibres, the pointer or indicator may be gradually tapered in any convenient manner so as to present a very fine pointer tip which is desirable in some types of instruments. In this connection it is to be noted that straight grained material, such as bamboo, is practically unaffected by variations in atmospheric conditions, and this characteristic, coupled with the fact that it may be readily formed into a slender member, renders such material peculiarly adaptable for use as meter pointers. In some instances it has been found desirable to apply a very thin coating of paraffin to the indicator 26 but this coating is only necessary when the instrument is subjected to very extreme atmospheric variations.

In Figs. 1 to 3 inclusive the shank 25 lies in substantially the same horizontal plane as the oppositely disposed arm 22 and the threaded arms 19 while in Fig. 4 a modified shank 33 is shown which is bent in order to raise the indicator 26 above the arms 19. The shank 33 is formed, as shown in Fig. 4, to accommodate certain standard types of instruments or meters wherein the graduated scale thereof lies in an elevated plane. By having the shank 33 formed in this manner the indicator 26 is raised sufficiently to permit its pointed tip 28 to lie immediately adjacent the elevated graduated scale of such meters.

In Fig. 5 the indicator 26 is disclosed in association with the graduated scale 30 and is so tapered that the visibility of the indicator tip 28 is increased as compared to the slender pointed tip disclosed in Figs. 1 and 2. The form of tip disclosed in Fig. 5 is often desirable for use with instruments which require pointers which have a broader tip than the type of pointer tip disclosed in Figs. 1 to 3 inclusive.

Instruments such as volt meters and ammeters are commonly used in shop practice for conducting tests and as already suggested are at times subjected to abnormal operating conditions. Under these circumstances the meter pointers are in certain instances caused to be violently swung from their normal position at one extremity of the scale to the other end thereof and thereby subjected to operating conditions for which the meter was not designed. Experience has shown that a very large percentage of damage experienced by instruments which are constantly being subjected to such abnormal operating conditions resides in the breakage or permanent bending of the meter indicators or pointers. Metallic materials which have heretofore been commonly employed in the construction of these indicators are very light and frail and experience has proven them not to be entirely fitted to withstand any appreciable amount of bending without experiencing permanent deformation. By providing the meter 10 with an indicator or pointer 26 having the characteristics already suggested, namely, such characteristics which will prevent the bending or breaking of the indicator under severe operating conditions, the repairs and replacements as a result of broken and bent pointers has been reduced to a minimum. The indicators 26 are very inexpensive and very readily attachable to the support shank 25 and thus present an indicator of economic design and construction, which renders very efficient service in connection with meters and instruments of a like nature which are subjected to severe operating conditions.

Although the invention has herein been described in connection with a particular type of meter and particular materials have been specifically referred to which may be used in the construction of the pointers, it is to be clearly understood that other materials may be used having the characteristics which have been set forth as being essential to the efficient use thereof. Likewise meters other than the type disclosed may be equipped with indicators having the characteristics of the indicator 26, and it is to be further understood that the invention should only be limited by the scope of the appended claim.

What is claimed is:

In an indicating device for meters, a pivotal indicator support provided with an apertured shank, and a slender bamboo indicator fixed at one extremity within the aperture of the shank.

In witness whereof I hereunto subscribe my name this 8th day of August A. D., 1927.

LOUIS EDWARD JOHNSON.